United States Patent
Boyer et al.

(10) Patent No.: US 11,805,960 B2
(45) Date of Patent: Nov. 7, 2023

(54) DISHWASHING APPLIANCE WITH SHROUDED FILTRATION ASSEMBLY

(71) Applicant: Midea Group Co., Ltd., Foshan (CN)

(72) Inventors: Joel Boyer, Louisville, KY (US); Robert M. Digman, Goshen, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 283 days.

(21) Appl. No.: 17/210,104

(22) Filed: Mar. 23, 2021

(65) Prior Publication Data

US 2022/0304545 A1 Sep. 29, 2022

(51) Int. Cl.
| | |
|---|---|
| A47L 15/42 | (2006.01) |
| B01D 29/03 | (2006.01) |
| B01D 29/11 | (2006.01) |
| B01D 29/13 | (2006.01) |
| B01D 29/17 | (2006.01) |
| B01D 29/64 | (2006.01) |

(52) U.S. Cl.
CPC ....... *A47L 15/4206* (2013.01); *A47L 15/4208* (2013.01); *A47L 15/4219* (2013.01); *A47L 15/4225* (2013.01); *B01D 29/03* (2013.01); *B01D 29/112* (2013.01); *B01D 29/13* (2013.01); *B01D 29/17* (2013.01); *B01D 29/6415* (2013.01); *B01D 29/6476* (2013.01); *B01D 2201/02* (2013.01); *B01D 2201/0415* (2013.01); *B01D 2201/0423* (2013.01)

(58) Field of Classification Search
None
See application file for complete search history.

(56) References Cited

U.S. PATENT DOCUMENTS

| | | | |
|---|---|---|---|
| 3,064,661 | A | 11/1962 | Jacobs |
| 6,615,853 | B2 | 9/2003 | Hegeman et al. |
| 7,146,992 | B2 | 12/2006 | Elick et al. |
| 7,232,494 | B2 | 6/2007 | Rappette |
| 8,540,822 | B2 | 9/2013 | Pyo et al. |
| 9,693,670 | B2 | 7/2017 | Dries |
| 2006/0118146 | A1* | 6/2006 | Deog Jeong ........ A47L 15/4208 134/58 D |
| 2006/0237049 | A1 | 10/2006 | Weaver et al. |
| 2019/0239715 | A1 | 8/2019 | Thiyagarajan |

FOREIGN PATENT DOCUMENTS

EP  2213217 A1  8/2010

OTHER PUBLICATIONS

Tang, Jing S., Modelling Study of Dishwasher Hydraulic Filteration System, Proceedings of the World Congress on Engineering and Computer Science, Oct. 22-24, 2019.

\* cited by examiner

*Primary Examiner* — Levon J Shahinian
(74) *Attorney, Agent, or Firm* — Gray Ice Higdon

(57) ABSTRACT

A dishwashing appliance with a shrouded filtration assembly for removing dishwashing sediment from recirculated dishwashing fluid is provided. The dishwashing appliance may include a tub, a spray system, a recirculation pump, a drainage pump, and a shrouded filtration assembly in fluid communication with the spray system, the recirculation pump, and the drainage pump. The shrouded filtration assembly may include a lid, a filter frame, and a sump housing.

25 Claims, 7 Drawing Sheets

DISHWASHING APPLIANCE WITH SHROUDED FILTRATION ASSEMBLY

BACKGROUND

Dishwashing appliances are used in many applications to clean articles such as dishes, silverware, cutlery, cups, glasses, pots, and pans, etc. During wash and rinse cycles, dishwashing appliances typically circulate dishwashing fluid through a dishwashing chamber over those articles to be cleaned or rinsed. The dishwashing fluid may be, e.g., various combinations of water and detergent during the wash cycle (which may include additives) during the rinse cycle. Conventional dishwashing appliances include a recirculation pump and a drainage pump for recirculating and draining the dishwashing fluid respectively within the dishwashing chamber. The recirculation pump feeds the dishwashing fluid to various spray arm assemblies for distribution throughout the dishwashing chamber. The dishwashing fluid is then collected in a sump located at or near the bottom of the dishwashing chamber and pumped back into the dishwashing chamber through, e.g., nozzles in one or more spray arm assemblies and other openings that direct the dishwashing fluid against the articles to be cleaned or rinsed.

Depending upon the level of food debris upon the washing articles, the dishwashing fluid used during the wash and rinse cycles will become contaminated with food debris in the form of particles that are carried with the dishwashing fluid. For many purposes, such as to protect the recirculation pump, it is beneficial to filter the contaminated dishwashing fluid by removing and/or reducing particles from the dishwashing fluid, so that relatively dean dishwashing fluid is supplied to the recirculation pump and applied to the articles in the dishwashing chamber.

Accordingly, a filtration system or assembly, which provides the functionality of retaining the food debris loosened by the dishwashing fluid and draining it away during a drainage cycle by the drainage pump, is a component for a dishwashing appliance. The filtration system in conventional dishwashing appliances typically passes a portion of the recirculated dishwashing fluid through the filters equipped in the system then into the recirculation pump. When the recirculation pump operates at a relatively high flow rate, however, keeping the filtration system clean and unblocked becomes increasingly difficult, especially when large amounts of food debris are suspended in the dishwashing fluid. Existing filtration systems are easily clogged, especially when the filter is located at the inlet of the recirculation pump and/or substantially horizontal.

Therefore, there remains a need in the art to improve the existing filtration systems of dishwashing appliances.

SUMMARY

The present disclosure is directed to an apparatus of a dishwashing appliance with a shrouded filtration assembly. In some embodiments, the dishwashing appliance may comprise a tub defining a dishwashing chamber having a tub floor therein, a spray system having one or more distribution devices within said dishwashing chamber, a recirculation pump operable to flow dishwashing fluid to said spray system, a drainage pump operable to flow dishwashing fluid mixed with food debris during dishwashing operation to a drainage pipe, and a filtration assembly in fluid communication with the spray system, the recirculation pump, and the drainage pump for filtration of the dishwashing fluid that has circulated through the dishwashing chamber. The filtration assembly positioned at bottom of the dishwashing chamber through a recess formed by the tub floor thereof. The filtration assembly may further comprise a lid having a first side and a second side, positioned at top of said filtration assembly and above the recess of the tub floor to form a gap therebetween around a periphery of the lid to allow the dishwashing fluid to flow into the filtration assembly, a filter frame coupled to the second side of the lid defining a filtration chamber, and a sump housing. The filter frame may be configured for attaching one or more filter screens thereon through which the dishwashing fluid flows into the filtration chamber for filtration. The sump housing may have an open top portion through which the filter frame is disposed, and a base portion having a recirculation intake port in fluid communication with the recirculation pump via a recirculation pump inlet port and a recirculation pump outlet port, and a debris collection chamber in fluid communication with the drainage pump and the drainage pipe via a drainage pump port and a drainage pipe port. When the dishwashing fluid is extracted by the recirculation pump from the filtration assembly by filtering through the filtration chamber to the recirculation pump via the recirculation intake port and the recirculation pump inlet port, and into the spray system via the recirculation pump outlet port therefrom, the dishwashing fluid circulates through the dishwashing chamber and flows back into the filtration assembly via the gap around the periphery of the lid, with the food debris proceeding into the debris collection chamber.

In some embodiments, the dishwashing appliance may comprise a tub defining a dishwashing chamber having a tub floor therein, a spray system having one or more distribution devices within said dishwashing chamber, a recirculation pump operable to flow dishwashing fluid to said spray system, and a filtration assembly in fluid communication with the spray system and the recirculation pump for filtration of the dishwashing fluid that has circulated through the dishwashing chamber. The filtration assembly positioned at bottom of the dishwashing chamber through a recess formed by the tub floor thereof. The filtration assembly may further comprise a lid positioned at top of said filtration assembly and above the recess of the tub floor to form a gap therebetween around a periphery of the lid to allow the dishwashing fluid to flow into the filtration assembly, a filter frame coupled to the lid defining a filtration chamber, and a sump housing. The filter frame may be configured for attaching one or more filter screens thereon through which the dishwashing fluid flows into the filtration chamber for filtration. The sump housing may have an open top portion through which the filter frame is disposed, and a base portion in fluid communication with the filtration chamber via a recirculation intake port and in fluid communication with the recirculation pump via a recirculation pump inlet port.

In some embodiments, a filtration assembly for an appliance including a tub defining a washing chamber having a tub floor is disclosed. The filtration assembly may be positioned at bottom of the dishwashing chamber through a recess formed by the tub floor thereof. The filtration assembly may comprise a lid positioned at top of the filtration assembly and above the recess of the tub floor to form a gap therebetween around a periphery of the lid to allow the dishwashing fluid to flow into the filtration assembly, a filter frame coupled to the lid defining a filtration chamber, and a sump housing. The filter frame may be configured for attaching one or more filter screens thereon through which the dishwashing fluid flows into the filtration chamber for filtration. The sump housing may have an open top through which the filter frame is disposed and a base portion having a recirculation intake port and a debris collection chamber defined as a trough formed extending around an outer perimeter of the recirculation intake port.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above-outlined features are to be understood as exemplary only, and many more features and objectives of the various embodiments may be gleaned from the disclosure herein. Therefore, no limiting interpretation of this summary is to be understood without further review of the entire specification, claims, and drawings included herewith. A more extensive presentation of features, details, utilities, and advantages of the present disclosure is provided in the following written description of various embodiments of the disclosure, illustrated in the accompanying drawings, and defined in the appended claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Figure 1:
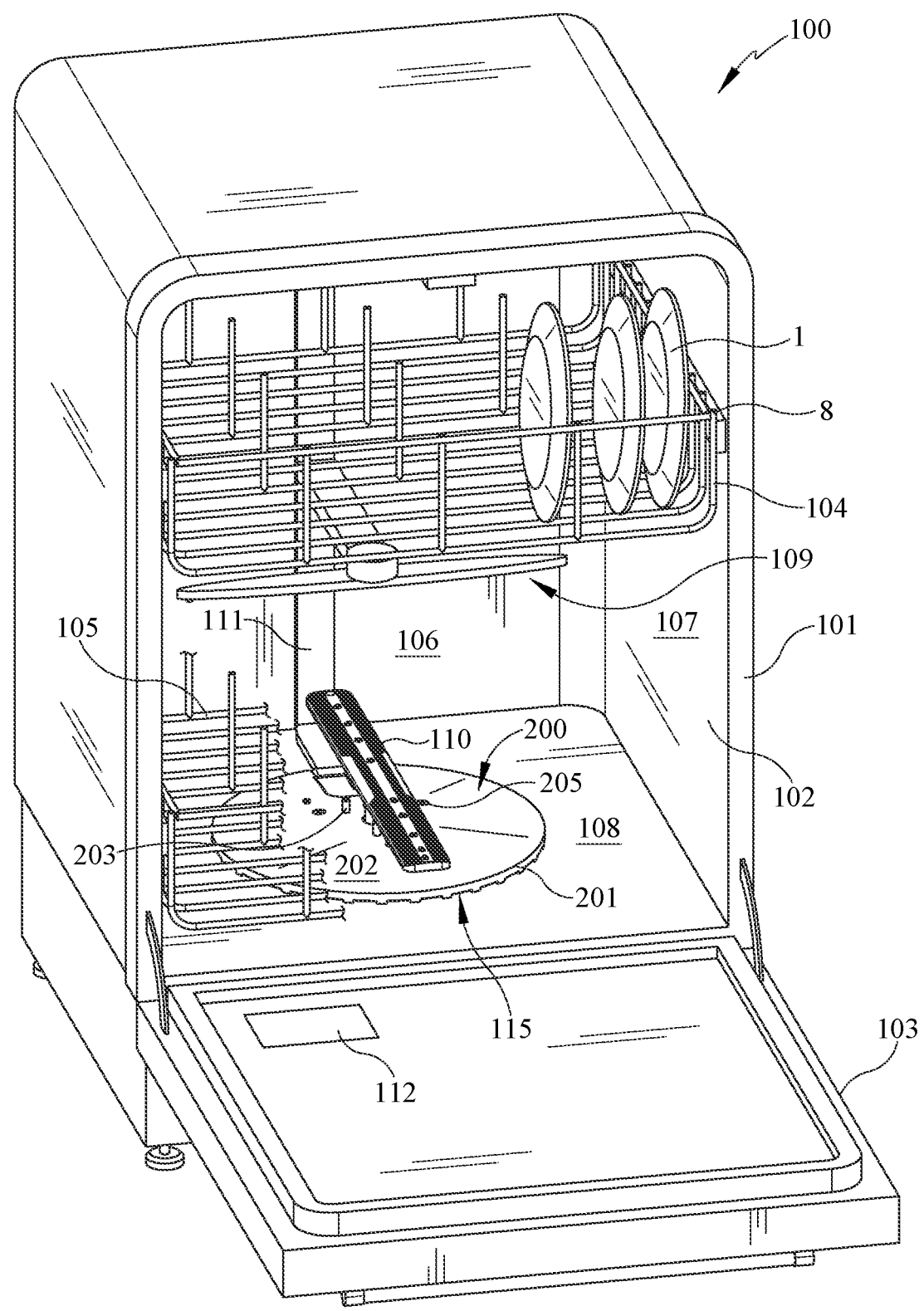
FIG. 1 is a perspective view of a dishwashing appliance with a shrouded filtration assembly, with a front door in a horizontal open position, according to an embodiment of the present disclosure.

It is to be understood that a dishwashing appliance with a shrouded filtration system is not limited in its application to the details of construction and the arrangement of components set forth in the following description or illustrated in the drawings. The described embodiments are capable of other configurations and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalents thereof, as well as additional items. Unless limited otherwise, the terms "connected," "coupled," and "mounted," and variations thereof herein, are used broadly and encompass direct and indirect connections, couplings, and mountings. In addition, the terms "connected" and "coupled" and variations thereof are not restricted to direct physical or mechanical connections or couplings.

The embodiments discussed hereinafter will, for convenience only, focus on the implementation of the hereinafter-described techniques within a residential type dishwashing appliance. However, it should be understood that the techniques may also be used in connection with other types of home appliances in some embodiments. For example, the techniques may be used in a commercial dishwashing application or a washing appliance (e.g., a washer) in some embodiments. Moreover, at least some of the herein-described techniques (e.g., a rotating self-cleaning device) may be used in connection with other different dishwashing appliance configurations, including dishwashing appliances utilizing filtration systems and/or dishwashing drawers.

Turning now to the drawings, wherein like numbers denote like parts throughout the several views, FIG. 1 is a prospective view of a dishwashing appliance 100 with a shrouded filtration assembly 200 according to an embodiment of the present disclosure. The dishwashing appliance 100 may share many features of a conventional dishwashing appliance and may not be described in detail herein except as necessary for a complete understanding of the disclosure. As shown in FIG. 1, the dishwashing appliance 100 may include a housing, cabinet, or tub 101, which the interior space thereof may be defined as a dishwashing chamber 102. The dishwashing chamber 102 may be, for example, a stamped metal cavity or an injection molded plastic cavity, with a top wall (not visible in the figures), a rear wall 106, an opposing side wall 107, and a tub floor 108. The top wall, rear wall 106, opposing side wall 107, and the tub floor 108 may be planar elements surrounding the dishwashing chamber 102. The dishwashing chamber 102 may have an open front face that may be accessible by opening a dishwashing door 103 hinged, typically, at its bottom for movement between a normally closed vertical position, wherein the dishwashing chamber 102 is sealed shut for dishwashing cycles, and a horizontal open position for loading and unloading of articles from the dishwashing appliance. The front door 103 may also include a detergent dispenser 112 located on the inner surface thereof for providing detergent to mix with the water for recirculation during wash cycles. Control over the dishwashing appliance 100 by a user may generally be managed through a control panel (not shown) typically disposed on a top or front portion of the front door 103, and it should be understood that in different designs, the control panel may include various types of input and/or output devices, including various knobs, buttons, lights, switches, textual and/or graphical displays, touch screens, etc. through which a user may configure one or more settings and start and stop a dishwashing operation.

In some embodiments, one or more dishwashing racks may be provided within the dishwashing chamber 102. For example, as shown in FIG. 1, an upper dishwashing rack 104 and a lower dishwashing rack 105 may be provided within the dishwashing chamber 102 to receive one or more washable items 1. The upper dishwashing rack 104 may be disposed above the lower dishwashing rack 105 and spaced apart by a predetermined distance. In some embodiments, the upper dishwashing rack 104 and the lower dishwashing rack 105 may be guided by a guide rail 8 provided on opposing side walls 107 of the dishwashing chamber 102, such that the dishwashing racks 104 and 105 may be drawn in and out through the open front face of the dishwashing chamber 102 between loading (extended) and dishwashing (retracted) positions along a substantially horizontal direction. In some embodiments, the lower dishwashing rack 105 may be supported on, for example, rollers, while the upper dishwashing rack 104 being supported by the guide rail 8. It should be understood that the dishwashing racks 104 and 105 may be in any feasible configurations suitable for holding dishes, pans, glasses, cups, utensils, or other washable items 1 that may be treated in the dishwashing chamber 102 without detracting from the disclosure. For example, in some embodiments as shown, the dishwashing racks 104 and 105 may include a plurality of tines to help support the washable items 1. It should be also understood that other particular support apparatus other than dishwashing racks 104 and 105 may be provided within the dishwashing chamber 102 for supporting the washable items 1 to be washed during dishwashing operation.

In some embodiments, the dishwashing appliance 100 may include a spray system for directing the dishwashing fluid into the dishwashing chamber 102 and over the washable items 1. The spray system may include one or more dishwashing fluid sprayers, which may be illustrated in the form of an upper spray arm assembly 109 and a lower spray arm assembly 110 as shown in FIG. 1. The one or more spray arm assemblies 109 and 110 may be provided within the dishwashing chamber 102 in a stacked manner and oriented relative to the dishwashing racks 104 and 105 such that the dishwashing fluid sprayed from the spray arm assemblies 109 and 110 may be directed onto the washable items 1 within the dishwashing racks 104 and 105. As shown in FIG. 1, for example, the upper spray arm assembly 109 may be located in an upper region of the dishwashing chamber 102 and in close proximity to the upper dishwashing rack 104, and the lower spray arm assembly 110 may be rotatably mounted at or near the bottom of the dishwashing chamber 102 and above the tub floor 118 so as to rotate in relatively close proximity to the lower dishwashing rack 105. In some embodiments, another top spray arm (not shown in the figures) may be located above the upper dishwashing rack 104. However, this positioning is not intended to be limiting, as various distribution devices may be positioned through the dishwashing chamber 102. In such embodiments as shown in FIG. 1, the upper spray arm assembly 109 below the upper dishwashing rack 104 may provide a dishwashing fluid spray upwardly through the open bottom of the upper dishwashing rack 104, and the lower spray arm assembly 110 below the lower dishwashing rack 105 may respectively provide a dishwashing fluid spray upwardly onto the washable items 1 therein. It should be understood that the upper spray arm assembly 109 may also optionally provide a dishwashing fluid spray downwardly onto the washable items 1 within the lower dishwashing rack 105 thereunderneath. In some embodiments, while the upper spray arm assembly 109 may be, but need not be, a fixed spray arm, the lower spray arm assembly 110 may be, but need not be, a rotational spray arm. It should be understood that the arrangement and/or the configuration of the one or more spray arm assemblies 109 and 110 is not limited to the present disclosure as the description here merely serves for illustration. For example, the dishwashing appliance 100 may alternatively include various combinations of wall-mounted sprayers, rack-mounted sprayers, oscillating sprayers, fixed sprayers, rotating sprayers, and focused sprayers, etc.

Each of the spray arm assemblies 109 and 110 may include an arrangement of discharge ports or orifices for directing the dishwashing fluid onto the washable items 1 located within the dishwashing racks 104 and 105. In some embodiments, the arrangement of the discharge ports in the spray arm assemblies 109 and 110 may provide a rotational force by virtue of the dishwashing fluid flowing through the discharge ports. The resultant rotation of the spray arm assemblies 109 and 110 may then provide coverage of the washable items 1 with a spray of the dishwashing fluid. The dishwashing fluid for the spray arm assemblies 109 and 110 may be fed by a recirculation pump for circulating the dishwashing fluid within the dishwashing chamber 102, and the one or more spray arm assemblies 109 and 110 may be supplied by respective conduits. For example, in some embodiments, the dishwashing fluid for the upper spray arm assembly 109 may be fed through an upper spray arm supply conduit 111 extending upwardly along the rear wall 106. While not described in detail herein, the conduits may be hoses, pipes, tubes, or the like as would be understood in the art. In some embodiments, a heater (not shown) may heat the dishwashing fluid supplied to various temperatures, thereby improving dishwashing efficiency and performance.

Figure 2:
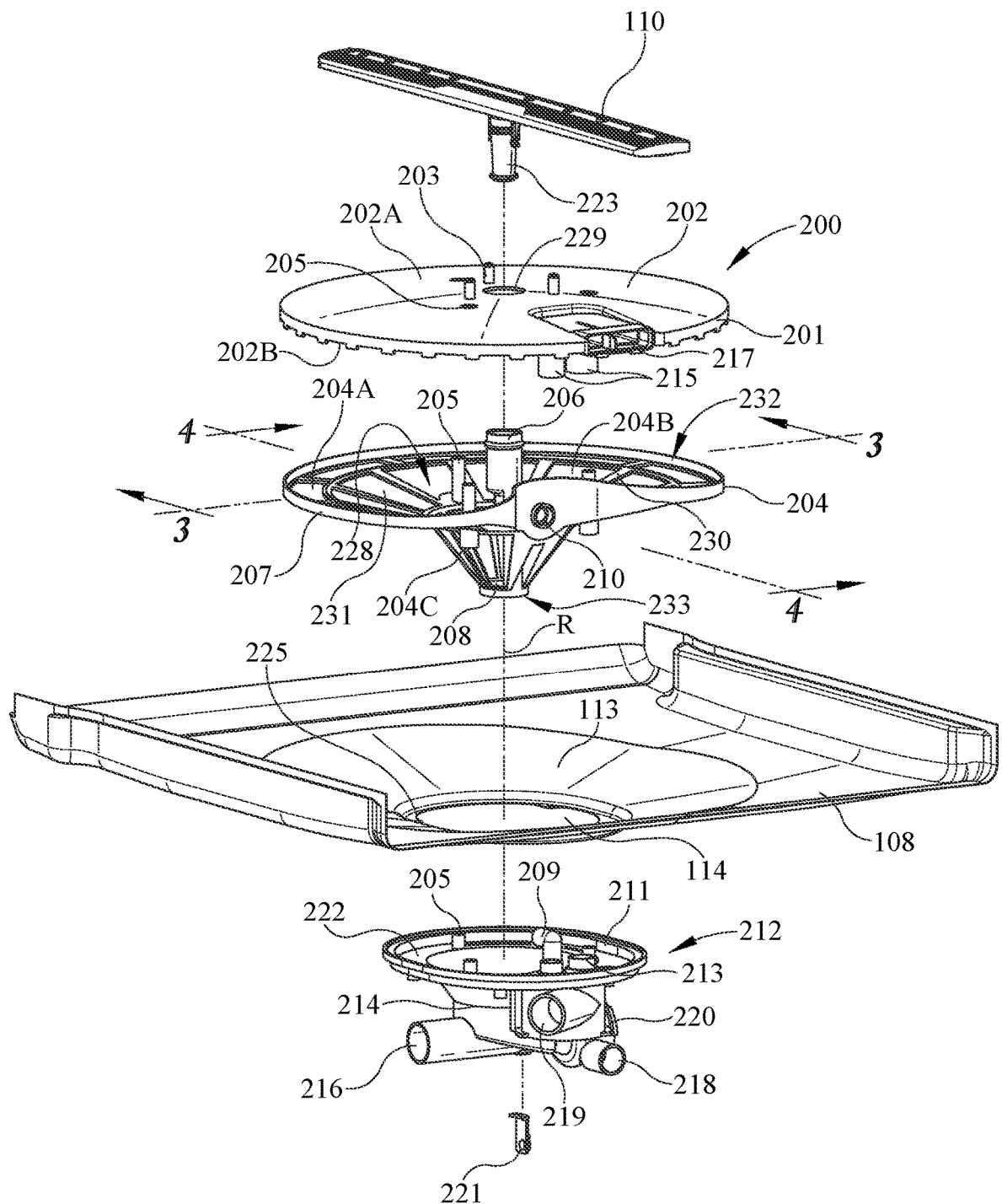
FIG. 2 is a perspective exploded view of the interior of the shrouded filtration assembly of FIG. 1, according to an embodiment of the present disclosure.

In some embodiments as best shown in FIG. 2, the tub floor 108 may include a recess 113 and an opening 114 over which a filtration assembly 200 may be removably received. In some embodiments, the recess 113 may be downwardly sloped toward the bottom of the dishwashing appliance 100 so that the dishwashing fluid sprayed from the spray system is collected in and directed toward the filtration assembly 200 for filtering and re-circulation during dishwashing operation. The object of providing the filtration assembly 200 is to remove food debris from the used dishwashing fluid before the dishwashing fluid is recirculated and once again is sprayed into the dishwashing chamber 102. The filtration assembly 200 may improve the final dishwashing result and ensure the function of the recirculation system (e.g., a recirculation pump) that otherwise could get blocked by the food debris contained in the dishwashing fluid.

Figure 3:
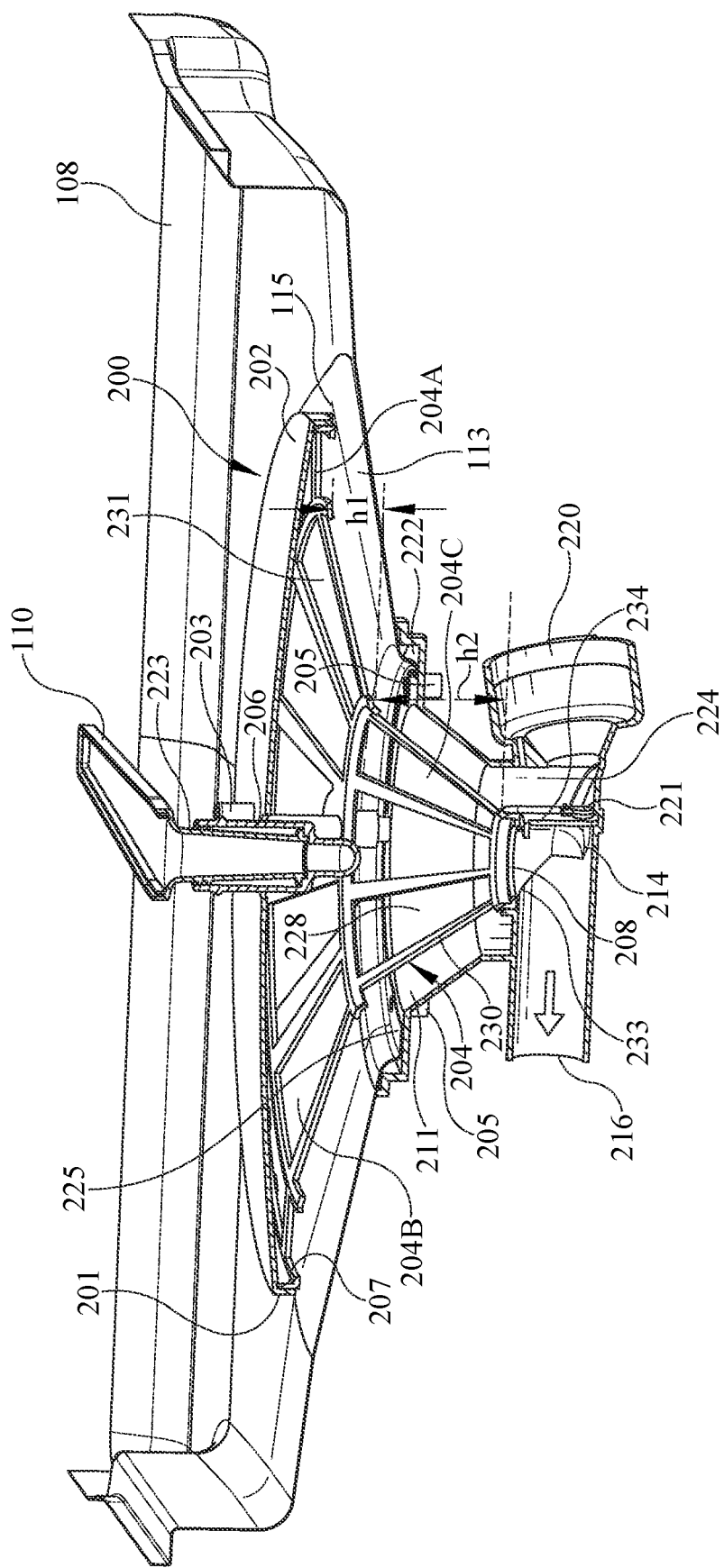
FIG. 3 is a sectional view of the shrouded filtration assembly of FIG. 1, according to an embodiment of the present disclosure.
Figure 4:
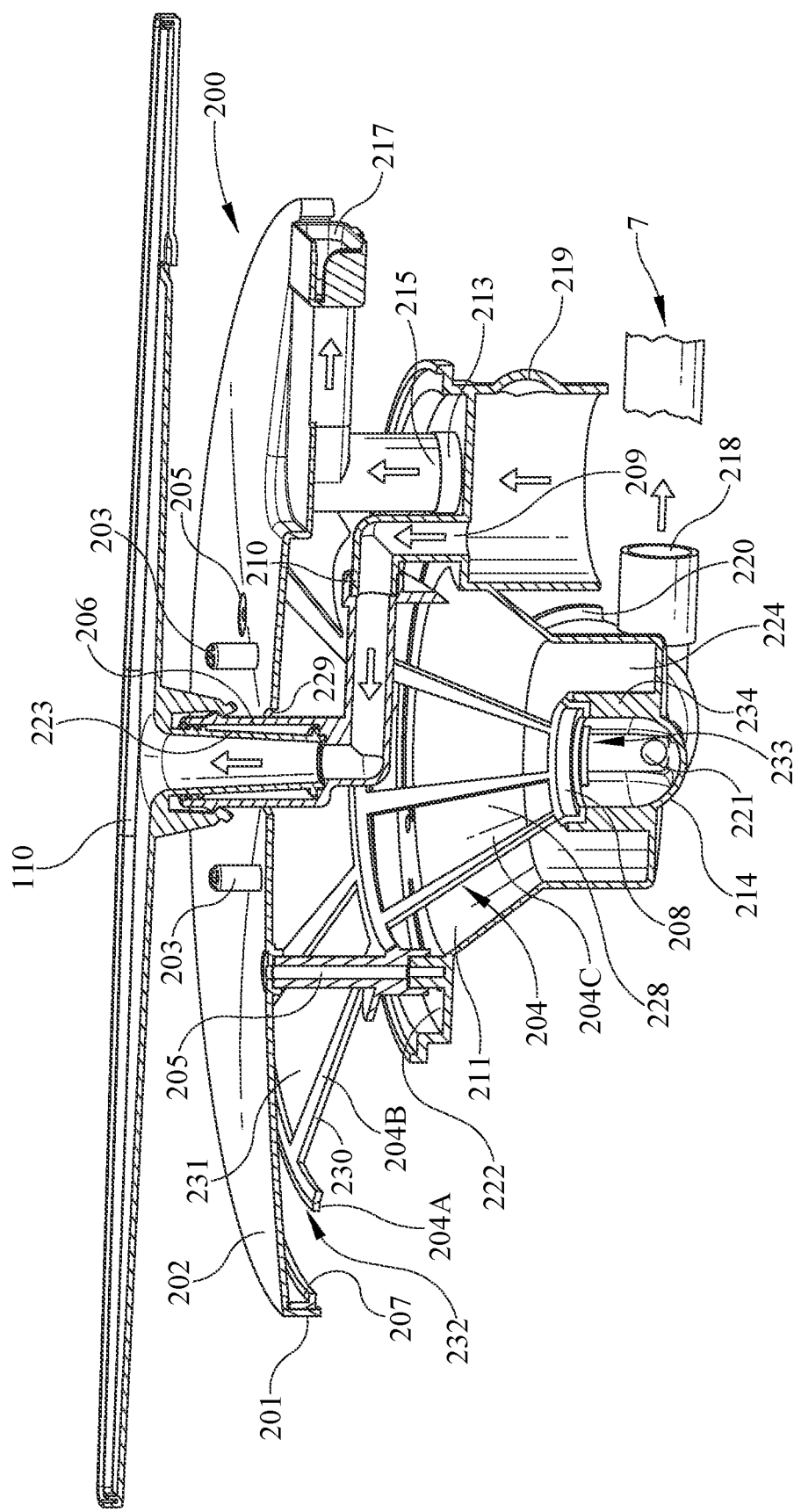
FIG. 4 is another sectional view of the shrouded filtration assembly of FIG. 1, according to an embodiment of the present disclosure.

Referring to FIG. 2, an exploded view of the shrouded type filtration assembly 200 in accordance with some embodiments of the present disclosure is illustrated. FIGS. 3 and 4 are cross-sectional views taken along line 3-3 and line 4-4 of FIG. 2, respectively. In some embodiments as shown, the filtration assembly 200 may include a lid 202, a filter frame 204, and a sump housing 212, and the filtration assembly 200 may be configured to provide filtered dishwashing fluid for recirculation in the dishwashing chamber 102. In some embodiments, the lid 202 may include a first (upper) side 202A and a second (bottom) side 202B and be generally circular in shape with a closed and impermeable surface body to prevent the dishwashing fluid from entering the filtration assembly 200 directly through the lid 202. In order to achieve a durable sealing effect to prevent the dishwashing fluid from flowing through the lid 202, different materials and/or material combinations may be used, such as plastic or rubber coating on one or both of the first and second sides 202A and 202B. In some embodiments, the first side 202A of the lid 202 may also be downwardly sloped to aid the dishwashing fluid sprayed from the spray system to be directed toward the filtration assembly 200 for filtration and recirculation, as will be described below.

In some embodiments, the lid 202 may be positioned at a top of the filtration assembly 200 and above the recess 113 of the tub floor 108 to form a gap 115 therebetween around a periphery 201 of the lid 202 as best shown in FIG. 1. With such an arrangement, the dishwashing fluid that has circulated through the dishwashing chamber 102 may flow into the filtration assembly 200 through the gap 115 and flow down along the sloped surface of the recess 113 towards the sump housing 212. The opening size of the gap 115 may be configured to prevent larger items from entering the filtration assembly 200, such as a piece of silverware or another washable item 1 that is dropped from the rack assemblies 104 and 105.

Figure 5:
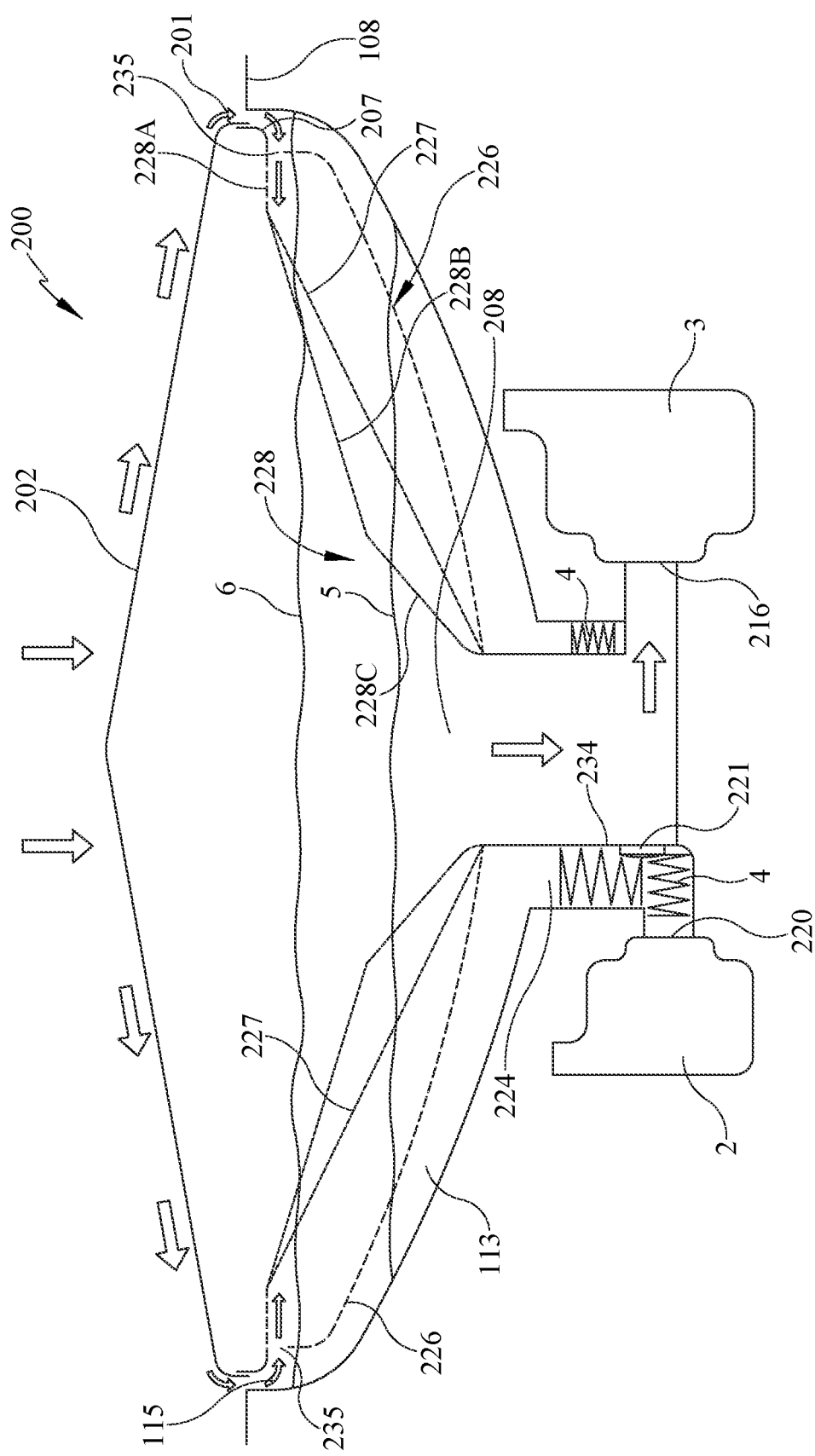
FIG. 5 is a schematic side view of a shrouded filtration assembly with different filter screen configurations, according to various embodiments of the present disclosure.

In some embodiments, the filter frame 204 may be coupled to the second or bottom side 202B of the lid 202 and configured to define a filtration chamber 228 positioned within the interior space of the filter frame 204, or more particularly, between a top end 232 and a bottom end 233 of the filter frame 204. In some embodiments, the planes of the top end 232 and the bottom end 233 may be parallel to each other. For mechanical filtration, the removal of soil particles of different sizes is typically achieved by providing fluid paths (such as pores or apertures) through a filter screen or filter media that are smaller than the particles for which filtration is desired. Particles having a dimension larger than the size of the fluid paths will be trapped to be prevented from passing through the filter screen while particles smaller than the size of the fluid path will generally be able to pass through. For example, a coarse filter may be employed on the filter frame 204 to retain large soil particles, while a fine filter may be utilized to remove smaller particles. Some particle sizes and/or types may not be harmful to the pump or spray arm assemblies and, therefore, may be allowed to pass into the recirculation pump system. Accordingly, the filter frame 204 may be configured for attaching one or more filter screens (e.g., 228A-C different filter screens as shown in FIG. 5) thereon through which the dishwashing fluid flows into the filtration chamber 228 for filtration. More particularly, for the embodiment depicted, the filter frame 204 may include a plurality of pillars 230 extending approximately along the vertical axis R from the top end 232 to the bottom end 233 with a plurality of filtration windows 231 defined therebetween. The one or more filter screens (e.g., the filter screens 228A-C as shown schematically in FIG. 5) may cover the plurality of filtration windows 231. It should be appreciated, however, that in other exemplary embodiments, the filter frame 204 may instead include any other suitable filter mediums as well as any other suitable support structure. The dishwashing sediment in the form of food debris, soil, and/or particles may then be filtered and separated from the dishwashing fluid as it passes through the one or more filter screens to proceed into a debris collection chamber 224 as will be described below.

In some embodiments, the filtration assembly 200 may include the sump housing 212 located in the lower part thereof for collecting residual dishwashing fluid from the dishwashing chamber 102 and the dishwashing sediment contained. The sump housing 212 may include an open top portion 211 and a base portion 214, and the open top portion 211 may be configured for receiving the filter frame 204 therethrough. In some embodiments, the top portion 211 of the sump housing 212 may include a flange portion 222 for accommodating various components, such as fastening elements 205 and/or one or more flow pathways as will be described below. In some embodiments, the flange portion 222 of the sump housing 212 may be coupled to the tub floor 108 via a flange of the recess 225 as shown in FIG. 2. In some embodiments, the interior shape of the sump housing 212 may be generally circular; however, as should be understood, the shape and depth of the sump housing 212 are not limited thereto. Rather, the sump housing 212 may have various shapes and depths so long as the sump accommodates and effectively collects the required volume of dishwashing fluid used during operation.

A recirculation pump 3 (as shown in FIG. 5) may be situated level with, or below the base portion 214 of the sump housing 212, and a recirculation pump inlet 216 with atmospheric pressure may be positioned at a side of the base portion 214 of the sump housing 212 to supply filtered dishwashing fluid to the recirculation pump 3. An opening may be arranged at the base portion 214 to be a recirculation intake port 208, and the dishwashing fluid collected in the filtration assembly 200 may flow to the recirculation pump 3 through the recirculation intake port 208 and the recirculation pump inlet 216 due to the suction force generated by the recirculation pump 3. In some embodiments, the recirculation intake port 208 may be an opening formed and projected from the bottom end 233 of the filter frame 204 as best shown in FIGS. 2-4. In some embodiments, a recirculation pump outlet port 219, which is pressurized, may be configured to discharge the filtered, recirculated dishwashing fluid from the recirculation pump 3 to the spray arm system including one or more distribution devices, such as the spray arm assemblies 109 and 110.

Additionally, a drainage pump 2 (as shown in FIG. 5) may be provided at a drainage pump port 220 and in fluid communication with a debris collection chamber 224 located at the bottom of the sump housing 212 of the filtration assembly 200 and a drainage port 218. The debris collection chamber 224 provides a volume for receiving and temporarily holding solid dishwashing sediment filtered apart from the recirculated dishwashing fluid during the wash cycle. In some embodiments, the debris collection chamber 224 may be an angled trough extending around an outer perimeter 234 of the recirculation intake port 208 as shown in FIGS. 2-5.

As best shown in FIG. 5, the drainage pump 2 may be configured to pump dishwashing sediment 4 accumulated in the debris collection chamber 224 to the drainage port 218 and ultimately to a building plumbing system drainage pipe 7 (as shown in FIG. 4), with a negative pressure created at the drainage port 218 when the drainage pump 2 is energized. In some embodiments, the drainage pump 2 may be positioned between the debris collection chamber 224 and the drainage port 218 to generate a suction force to force the dishwashing fluid and the dishwashing sediment to the drainage port 218. A pump motor (not shown) may be electrically connected to a motor controller (not shown) that controls the drainage pump 2 and the recirculation pump 3 respectively to achieve desired dishwashing cycle sequences during operation of the dishwashing appliance 100.

As best shown in FIG. 2, the filtration assembly 200 may include one or more fasteners 205 (e.g., rivets, pins, screws, bolts, nuts, clips, flanges, or other hardware items) to couple the different components (e.g., the lid 202, the filter frame 204, and the sump housing 212, etc.) together. In some embodiments as shown, the one or more fasteners 205 may be pin-slot mechanisms for integrally coupling the lid 202 and the sump housing 212 to the filter frame 204. It should be understood that other suitable coupling methods (e.g., hook-and-loop fasteners, snaps, riveting, adhesive, or the like) may also be acceptable here. In such a manner, the filtration assembly 200 may be easily assembled and disassembled for components change/replacement/clean in both a quick and easy manner. In some embodiments, one or more sealing members (e.g., elastomer O-rings) may be positioned to fit against different components of filtration assembly 200 wherein the different components are integrally disposed adjacent to one another, to further seal off the dishwashing fluid flow.

Accordingly, during operation of the dishwashing appliance 100, with the recirculation pump 3 operating, the dishwashing fluid stored in the sump housing 212 of the filtration assembly 200 may be simultaneously or selectively directed to the upper spray arm assembly 109 and/or the lower spray arm assembly 110. The dishwashing fluid may be provided with a dishwashing agent dispensed from the detergent dispenser 112 to wash the washable items 1 received in the racks 104 and 105 within the dishwashing chamber 102. The dishwashing fluid circulates through the dishwashing chamber 102, flowing into the filtration assembly 200 through the gap 115 formed around the periphery 201 of the lid 202, through the one or more filter screens into the filtration chamber 228 for flirtation, then into the recirculation pump 3 via the recirculation intake port 208 and the recirculation pump inlet port 216 as best shown in FIG. 3, then through the recirculation pump outlet port 219 back to the spray system. Meanwhile, most of the dishwashing sediment, such as food debris, contained in the recirculated dishwashing fluid may proceed into the debris collection chamber 224 located at the bottom of the sump housing 212 directly by gravity, without first going through coarse filters typically required in conventional filtration systems for dishwashing appliances. Thus, with such a configuration of the filtration assembly 200, most of the dishwashing sediment in the dishwashing fluid may be filtered from the dishwashing fluid without having to pass through the one or more filter screens. This may greatly alleviate the potential filter clogging problems, thereby improving dishwashing efficiency and performance.

In some embodiments, the filter frame 204 may include one or more flow paths in fluid communication with the spray system and the recirculation pump. For example, in some embodiments, a flow pathway including a first lower spray arm connection element 206 and a second lower spray arm connection element 223 may extend beneath the lower spray arm assembly 110 and is in fluid communication with the filtration system to supply dishwashing fluid to the lower spray arm assembly 110. The first lower spray arm connection element 206 may be provided on the filter frame 204, and the second lower spray arm connection element 223 may be provided on the lower arm assembly 110. Further, the filter frame 204 may include a filter frame flow path inlet port 210 in fluid communication with the first lower spray arm connection element 206 and a first sump housing flow path 209 located on the sump housing 212 to channel the recirculated dishwashing fluid from the filtration assembly 200 to the lower spray arm assembly 110.

In such embodiments, the lid 202 may include an opening 229 for at least a portion of the flow paths built in the filter frame 204 (e.g., the flow path formed by coupling the first lower spray arm connection element 206 and the second lower spray arm connection element 223 together). The coupling mechanism between the first lower spray arm connection element 206 and the second lower spray arm connection element 223 may be configured to prevent the dishwashing fluid from entering the filtration assembly 200 through the opening 229. In some embodiments, the lid 202 may also include one or more flow paths in fluid communication with the spray system. For example, as shown in FIGS. 2 and 4, the lid 202 may include a lid flow path inlet 215 and an upper spray arm supply path inlet 217 to the upper spray arm 109 through the upper spray arm supply path 111. In some embodiments, the lid flow path inlet 215 may be coupled to the second sump housing flow path 213 located on the sump housing 212 to channel the recirculated dishwashing fluid from the filtration assembly 200 to the upper spray arm assembly 109.

In some embodiments, the lid 202 may include one or more air vents 203 for venting of the filtration chamber 228 during dishwashing operation. As the lower spray arm 110 may extend upwardly from the geometric center (e.g., through the opening 229) of the lid 202 in some embodiments, the air vents described herein may be located off-center of the lid 202 so that air in the filtration chamber 228 is more effectively released. Without the one or more air vents 203, an air bubble could form underneath the lid 202 and prevent the filtration assembly 200 from operating correctly.

The filtration assembly 200 discussed above including the lid 202, the filter frame 204, and the sump housing 212 may be made either of sheet-metal or a plastic material that are able to withstand the changing temperatures in the dishwashing chamber 102 without deforming. It should be understood that the specific design of the filtration assembly 200 may vary depending on the size and use of the dishwashing appliance 100. For example, the size of the filter frame 204 may be adapted to ensure the desired filtering capacity for the specific dishwashing appliance 100 it is intended to be fitted in. It should also be appreciated, however, that in some other embodiments, the filtration assembly 200 may have any other suitable configurations different from the description herein. For example, the recirculation intake port 208 and/or the recirculation pump inlet port 216 may be positioned at any other suitable locations within the filtration assembly 200.

In some embodiments as shown in FIG. 2, the filter frame 204 may include an approximate cone-shaped frame structure around a vertical axis R with the bottom end 233 of the filter frame 204 in a substantially circular shape to aid in channeling the flow of dishwashing fluid across one or more filter screens thereon. It should be appreciated that the shape and/or configuration of the filter frame 204 is not limited thereto. The filter frame bottom end 233 could however also have other shapes like for example oval, rectangular, or triangular. For example, if the bottom end 233 is in a substantially circular or oval shape, the shape of the filter frame 204 could correspond to a section of a sphere, in other words have a shape of a cup with a curved filter surface. In some other embodiments, the shape of the filter frame 204 may be an approximate pyramid with a base corresponding to the shape (e.g., square) of the bottom end 233. In some embodiments, the filter frame 204 may be configured to include an accordion-like cross section for increasing the presented filtration area.

In such embodiments, the filter frame 204 may integrally include a plurality of distinct openings at different levels thereof such that different sized dishwashing sediment are collected at varying locations. For example, the filter frame 204 may include a top portion 204A with openings, a middle portion 204B with openings, and a bottom portion 204C with openings in some embodiments as shown in FIGS. 2-4. In such embodiments, the top portion 204A may be a flat periphery flange plane portion, substantially being at the same level with the top end 232 of the filter frame 204. In some embodiments, the top portion 204A may include a filter frame periphery 207, which may be tightly coupled with the periphery 201 of the lid 202 to avoid fluid leakage. By contrast, the middle and bottom portions 204B and 204C may extend in different angles (e.g., any degrees between 0 and 90 degrees) between the flat top portion 204A and the bottom end 233, generally sloping downwardly and inwardly from the top portion 204A to the bottom end 233 so that dishwashing fluid and/or the sediment may be more easily urged into the sump housing 212 and/or the debris collection chamber 224. For example, the surface of the middle portion 204B may extend in 45 degrees from the vertical axis R, while the surface of the bottom portion 204C may extend in 80 degrees from the vertical axis R. In detail, a vertical height of the middle portion 204B from the top of the bottom portion 204C to the bottom of the top portion 204A may be defined as h1, and another vertical height from the bottom end 233 to the top of the bottom portion 204C may be defined as h2. In some embodiments as best shown in FIG. 3, the h1 may be smaller than h2.

Further in such embodiments, each of the plurality of portions of the filter frame 204 may be integrally coupled with a filter screen having a certain filtering permeability. In some embodiments, the filtering permeability may be defined by a plurality of openings with a certain maximum allowable size (i.e., a certain filtering permeability) provided on a filter screen to allow the dishwashing fluid to pass through into the filtration chamber 228, while preventing the dishwashing sediment greater than the maximum allowable size of the openings from passing through. Thus, the filter screen may prevent such sizes of dishwashing sediment from flowing into, e.g., the recirculation pump and the spray system. In such embodiments, the maximum allowable size or the filtering permeability may correspond to a maximum size of dishwashing sediment the recirculation pump and the spray system can accommodate. In some embodiments, the top portion 204A may be provided with a first filter screen 228A with a first filtering permeability that filters relatively large dishwashing sediment from the dishwashing fluid (e.g., a coarse filter screen), while the bottom portion 204C may be provided with a third filter screen 228A with a third filtering permeability that filters relatively fine dishwashing sediment from the dishwashing fluid (e.g., a fine filter screen). The middle portion 204B may be provided with a second filter screen 228B with a second filtering permeability greater than the third filtering permeability but smaller than the first filtering permeability. In other words, in such embodiments, the first filtering permeability may be greater than the second filtering permeability, and the second filtering permeability may be greater than the third filtering permeability. Still in other words, for the embodiment depicted, the second filter screen 228B may be configured to filter dishwashing sediment smaller than the plurality of openings in the first filter screen 228A but larger than the plurality of openings in the second filter screen 228B. Accordingly, the filter screens 228A-C may be configured to filter out dishwashing sediment (e.g., food debris) that has been washed from the debris-laden washable items 1 and that is larger than the individual openings in the filter screens 228A-C. The smaller the openings in the filter screen, the larger the volume of dishwashing sediment that will be filtered from the contaminated dishwashing fluid, and vice versa.

In some embodiments, the filter screens 228A-C may include a mesh wire or plastic screen that is affixed over the filter frame 204. The filter screen 228A-C may also be designed to have a considerably large screen area size to ensure the desired filtration capacity even though parts thereof are blocked by collected sediment particles and dirt. In some embodiments, the filter screens 228A-C may have a substantially constant thickness, but the filter screens 228A-C may be modified in a number of different ways without departing from the scope of the disclosure. In some embodiments, the entire filter frame 204 may be made of a filtering material similar to the filter screens 228A-C in order to maximize the filtering area, alternatively, only the filter screens 228A-C are made of a filtering material.

FIG. 5 is a functional schematic of the filtration assembly 200 as described above to better illustrate the advantages with the disclosed configuration. As discussed previously, the filter screens 228A-C may get clogged, particularly in the pre-wash cycle when a large amount of loose dishwashing sediment is falling into the debris collection chamber 224 and accumulate therein. More dishwashing sediment could also come down from the washable item 1 when the dishwashing cycle starts. As fluid passes through the filter screens 228A-C of filter frame 204, the dishwashing sediment 4 may be blocked by the openings thereof and accumulate on the exterior surface of the filter screens 228A-C and deleteriously affect the filtration efficiency by blocking the openings. For example, as shown in FIG. 5, with a large amount of the dishwashing sediment 4 accumulated in the debris collection chamber 224, and if the accumulation cannot be removed quickly, the filters clean surface of the third filter screen 228C area may reduce and eventually reach a critical value at which the dishwashing fluid through flow rate becomes lower than that required by the recirculation pump 3. For conventional filtration systems with a fine filter screen prior to the dishwashing fluid entering the circulation pump, the circulation pump may run out of dishwashing fluid due to the clogging and stop operating completely. As a result, the dishwashing operation may have to be terminated prematurely due to the potential pump failure, resulting in reduced dishwashing efficiency, increasing the water and energy usage and the running cost.

With the disclosed design, the first and the filter screens 228A and 228B, which are positioned in a series flow configuration with the third filter screen 228C, are also configured to receive dishwashing fluid from the filtration assembly 200. Under the situation that the third filter screen 228C (the fine filter) is clogged, the dishwashing fluid may enter the filtration chamber 228 through the second filter screen 228B (the middle filter between the fine filter and the coarse filter). If the second filter screen 228B is also clogged later, the dishwashing fluid may enter the filtration chamber 228 through the first filter screen 228A (the coarse filter). More particularly, the recirculated dishwashing fluid may travel through either the first filter screen 228A, the second filter screen 228B, or the first filter screen 228C to recirculation pump 3 via the recirculation intake port 208 and the recirculation pump inlet port 216. With such a series configuration for the filter screens instead of the conventional parallel configuration, each of the plurality of filter screens may receive a similar amount of dishwashing fluid so that the recirculation pump 3 may still receive enough filtered dishwashing fluid to maintain appropriate operation when a filter screen clogging occurs.

In some other embodiments, the filtration assembly 200 may also have an improved in-series configuration for the filter screens to mitigate the clogging issues. For example, in some embodiments, the filter frame 204 may integrally include a plurality of layers of filter screens overlapping each other thereon. In such embodiments, the plurality of layers of filter screens may be integrally coupled to the filter frame 204 in a manner that an outermost layer has a greater filtering permeability than that of an innermost layer. For example, as shown in FIG. 5, the outermost filter screen may be a coarse filter screen 226, while the innermost filter screen may be a fine filter screen 227. As shown by the arrows indicating the dishwashing fluid direction in FIG. 5, the dishwashing fluid may wick around the lid periphery 201 and enter into the filtration assembly 200 through a dishwashing fluid entry 235 due to the dishwashing fluid surface tension, while allowing momentum to carry most sediment particulates past the entry 235 to proceed into the debris collection chamber 224, thereby decreasing the fine screen 227 clogging possibilities. In such embodiments, during dishwashing fluid recirculation, the coarse filter 226 may be configured to capture large particles which may clog the recirculation pump or the spray system during dishwashing, while the fine filter 227 may be configured to further remove small (and large) particles from the dishwashing fluid that may degrade dishwashing and drying quality.

In some embodiments, a drain check valve 221 may be provided in the base portion 214 of the sump housing 212 and configured to open or close the flow communication between the recirculation intake port 208 and the drainage port 218. The drain check valve 221 may be configured to open in one way to only allow the dishwashing fluid and sediment accumulated in the recirculation intake port 208 of the sump housing 212 to flow into drainage port 218 and be discharged from the sump housing 212 when the drainage pump 2 is running, but prevent the flow in an opposite direction when the recirculation pump 3 is running. In some embodiments as best seen in FIGS. 3-5, the check valve 221 may be provided on the outer perimeter 234 of the recirculation intake port 208, with check valve 221 functioning as a seal by pressure when in an unactuated or sealing position when the recirculation pump 3 is running, preventing dishwashing sediment 4 within the debris collection chamber 224 from entering the recirculation pump 3 and further preventing recirculating dishwashing fluid in sump housing 212 from entering drainage pump 2. With the check valve 221, when drainage pump 2 is actuated, the dishwashing fluid and any particles contained therein, may be pulled from the recirculation intake port 208. More specifically, the low pressure created by the drainage pump 2 may force the check valve 264 to open, allowing fluid and sediment within the recirculation intake port 208 to be channeled to the debris collection chamber 224 then out to a drain through the drainage port 218.

In some embodiments, the disclosed design may also create a back flush effect to help to keep the filter screens clean. At the end of a wash cycle, the recirculation pump 3 may deactivate and stop providing pressurized fluid through various conduits. At such time, the weight of the fluid positioned in the conduits, such as the upper spray arm supply conduit 111 on the rear wall 106 as shown in FIG. 2, may cause a reversal of the flow of dishwashing fluid through the filtration assembly 200. More particularly, the dishwashing fluid may travel back through the recirculation pump 3 and/or into the filtration assembly 200 via the recirculation intake port 208. As shown in FIG. 5, the first dishwashing fluid level 5 is when a wash cycle is on (i.e., the recirculation pump 3 is running), and the second dishwashing fluid level 6 is when a wash cycle is off (i.e., the recirculation pump 3 is not running). Thus, at the end of a wash cycle, the dishwashing fluid level in the filtration assembly 200 may gradually increase from the first dishwashing fluid level 5 to the second dishwashing fluid level 6. For example, when the recirculation pump 3 is running, the dishwashing fluid flows from the filtration assembly 200 to the spray system. When the recirculation pump 3 is turned off, the dishwashing fluid in the fluid pathways (e.g., the upper spray arm supply path 111) falls downward due to its own potential energy (i.e., its own weight, or gravity) and may be therefore re-supplied to the filtration assembly 200, leading to a higher fluid level therein. In this process, the back flowing dishwashing fluid collides with the filter screens (e.g., the filter screens 228A-C) as it back flows, at a magnitude of force corresponding to the potential energy of the dishwashing fluid, such that the dishwashing sediment are separated from the filter screens. Thus, the back flow of the dishwashing fluid may have a back flush effect on the filter screens to remove the attached dishwashing sediment. In some embodiments, the separated debris may fall directly into the debris collection chamber 224 and be exhausted to a drain.

Figure 6:
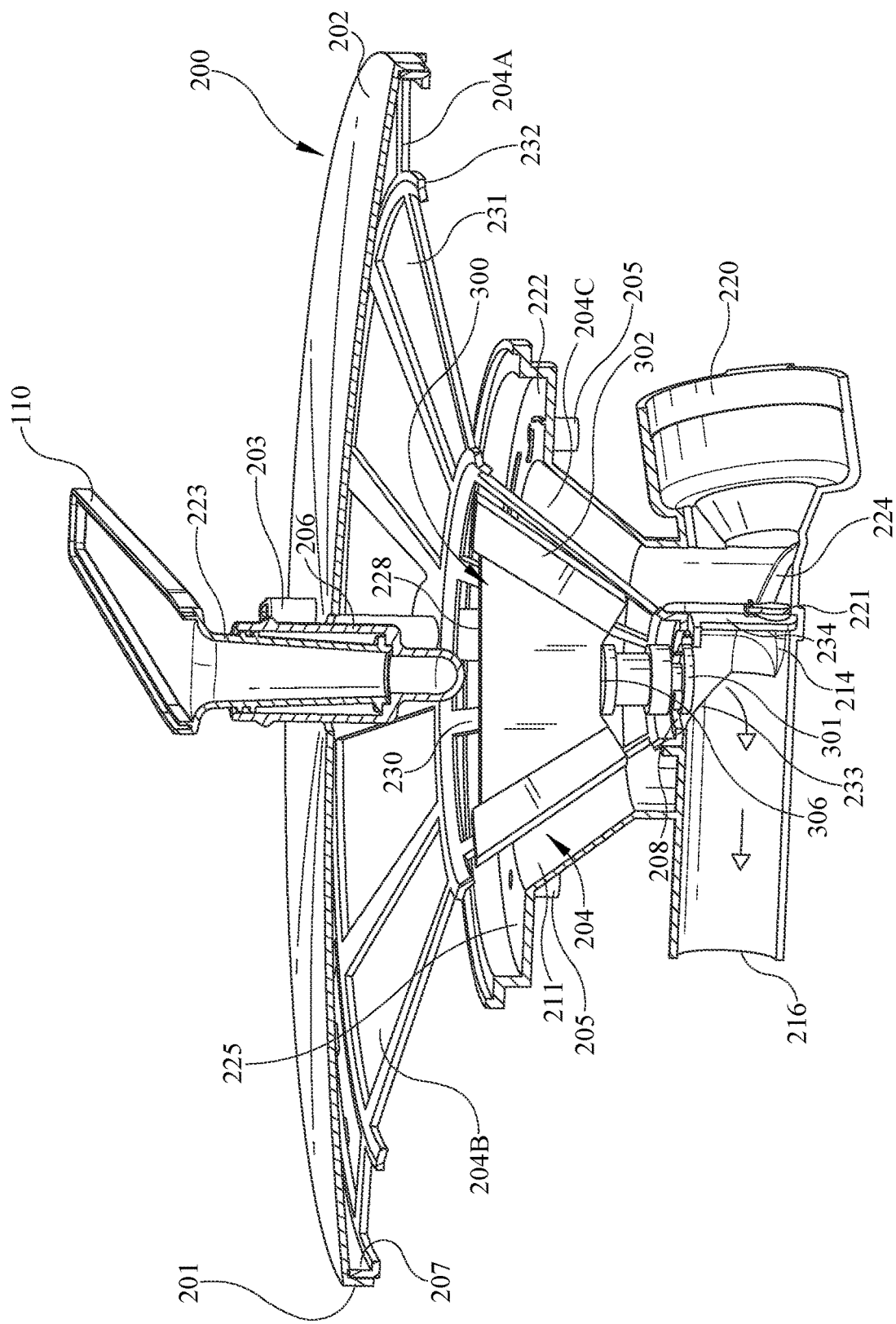
FIG. 6 is a sectional view of a shrouded filtration system, with a built-in rotating self-cleaning device, according to an embodiment of the present disclosure.

As set forth above, clogging of filter components is a key issue in dishwashing appliance design. Accordingly, in some embodiments, a self-cleaning device 300 designed to automatically remove sediment build-up and clogging of the filter screens during wash and drain cycles is provided. The rotatable filter self-cleaning device 300 may be provided to remove the dishwashing sediment from the filter screen surfaces. As shown in FIG. 6, in some embodiments, the self-cleaning device 300 may be equipped with features for scraping or wiping the surfaces of the filter screen surfaces, thus preventing the one or more filter screens from clogging due to the dishwashing sediment. In such embodiments, the filter self-cleaning device 300 may rotate within the filtration chamber 228 with a wiping mechanical scraper 302. In some embodiments, the mechanical scraper 302 may include at least one of a single blade, multiple blades, and a brush. It should be appreciated that other features may be used as well.

In some embodiments, energy from fluid flow caused by a pump may be used to rotate the self-cleaning device 300, i.e., energy from fluid flow caused by the recirculation pump may be used to rotate the self-cleaning device 300. In such embodiments, the self-cleaning device 300 may include an impeller 301 at an end portion 306 close to the recirculation intake port 208, and the impeller 301 may rotate in response to the driving force created by the recirculation pump 3 moving the dishwashing fluid flow. It should be understood that the operation of the self-cleaning device 300 built in the filtration assembly 200 may also be activated by an independent driving mechanism (e.g., a motor). In such embodiments, the self-cleaning device 300 may precisely and effectively sweep away dishwashing sediment from the filter screen surfaces, yet operates independently of the distribution devices (e.g., rotating spraying arms) of the dishwashing appliance.

Figure 7:
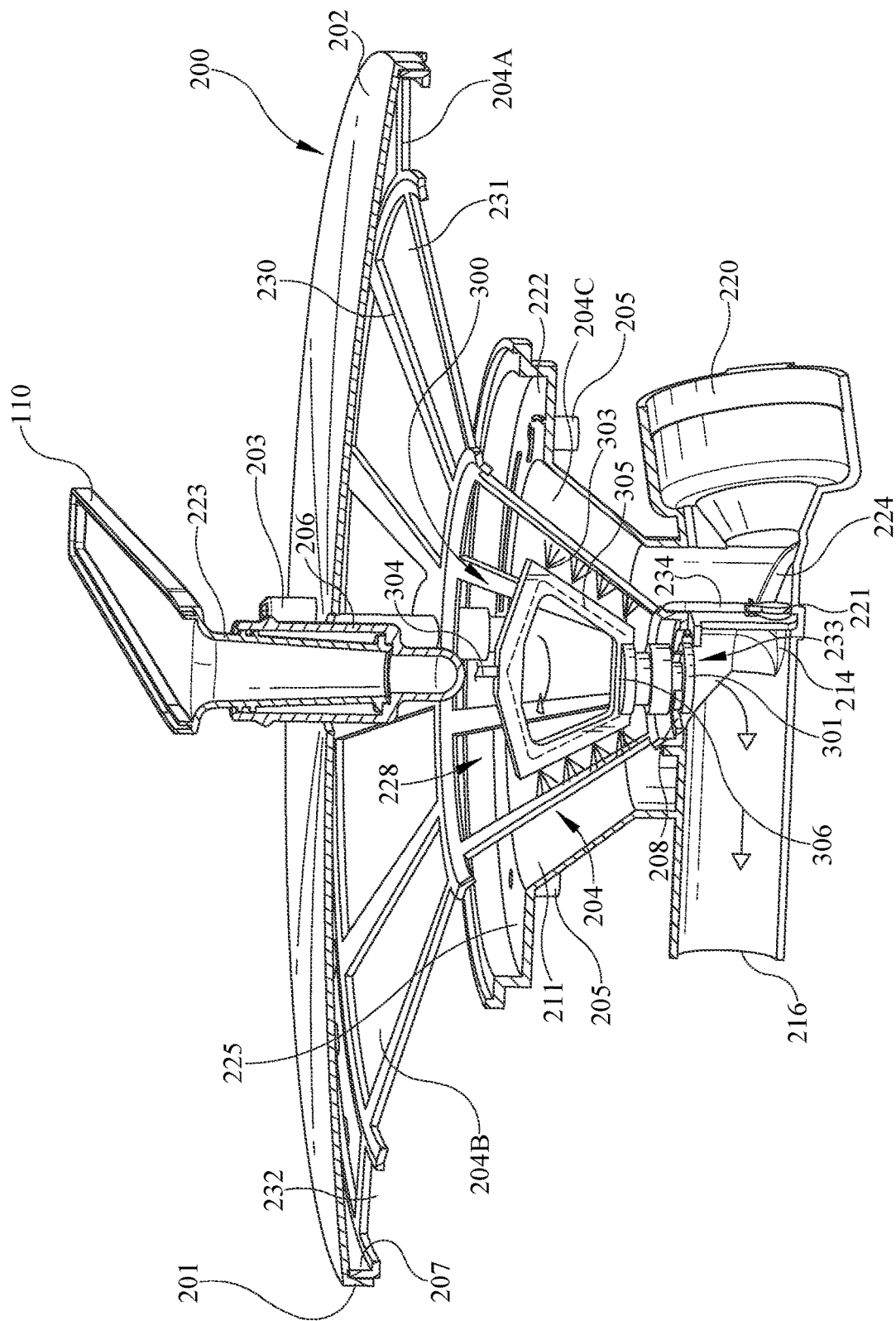
FIG. 7 is a sectional view of a shrouded filtration system, with a built-in rotating water spraying self-cleaning device with nozzles, according to another embodiment of the present disclosure.

In some other embodiments, the self-cleaning device 300 may rotate within the filtration chamber 228 and use water sprays from a plurality of nozzles 303 to remove sediment on the filter screen surface. A variety of configurations and features may be used with the plurality of nozzles 303 to promote effective cleaning of the filtration assembly 200. For example, in the embodiments as shown in FIG. 7, an interior flow path 305 may be connected to a water inlet 304 to provide a spray of washing fluid through the plurality of nozzles 303 across the filter screen surfaces for cleaning. The washing fluid, such as clean water, may be supplied from the water inlet 304. In such embodiments, the rotatable self-cleaning device 300 may be rotated by a rotational force by virtue of said washing fluid flowing through said plurality of nozzles.

In general, it should be understood that some features described above do not constitute limitations of the present disclosure, but rather have only been described for the sake of completeness. Instead, the present disclosure is particularly directed to a dishwashing appliance 100 configuration along with a shrouded filtration assembly 200. It should also be understood that the shrouded filtration assembly 200 may be a variety of constructions, shapes, sizes, quantities, and positions but still accomplish the same intent. The shrouded filtration assembly 200 depicted in the accompanying figures may include additional components and that some of the components described in those figures may be removed and/or modified without departing from scopes of the elements disclosed herein. The elements depicted in the figures may not be drawn to scale and thus, the elements may have different sizes and/or configurations other than as shown in the figures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A dishwashing appliance comprising:
   a tub defining a dishwashing chamber having a tub floor therein;
   a spray system having one or more distribution devices within said dishwashing chamber;
   a recirculation pump operable to flow dishwashing fluid to said spray system;
   a drainage pump operable to flow dishwashing fluid mixed with food debris during dishwashing operation to a drainage pipe; and
   a filtration assembly in fluid communication with said spray system, said recirculation pump, and said drainage pump for filtration of said dishwashing fluid that has circulated through said dishwashing chamber, said filtration assembly positioned at bottom of said dishwashing chamber through a recess formed by said tub floor thereof, said filtration assembly further comprising:
- a lid having a first side and a second side, positioned at top of said filtration assembly and above said recess of said tub floor to form a gap therebetween around a periphery of said lid to allow said dishwashing fluid to flow into said filtration assembly;
- a filter frame coupled to said second side of said lid defining a filtration chamber, said filter frame configured for attaching one or more filter screens thereon through which said dishwashing fluid flows into said filtration chamber for filtration; and
- a sump housing having an open top portion through which said filter frame is disposed, and a base portion having a recirculation intake port in fluid communication with said recirculation pump via a recirculation pump inlet port and a recirculation pump outlet port, and a debris collection chamber in fluid communication with said drainage pump and said drainage pipe via a drainage pump port and a drainage pipe port, wherein
- when said dishwashing fluid is extracted by said recirculation pump from said filtration assembly by filtering through said filtration chamber to said recirculation pump via said recirculation intake port and said recirculation pump inlet port, and into said spray system via said recirculation pump outlet port therefrom, said dishwashing fluid circulates through said dishwashing chamber and flows back into said filtration assembly via said gap around said periphery of said lid, with said food debris proceeding into said debris collection chamber.

2. The dishwashing appliance of claim 1, wherein said filter frame further comprises an approximate cone-shaped frame structure around a vertical axis.

3. The dishwashing appliance of claim 2, wherein said filter frame integrally includes a plurality of distinct openings at different levels of said filter frame.

4. The dishwashing appliance of claim 3, wherein each of said plurality of distinct openings of said filter frame is integrally coupled with a filter screen having a certain filtering permeability.

5. The dishwashing appliance of claim 3, wherein said plurality of distinct openings of said filter frame integrally include an upper portion, a middle portion, and a bottom portion, wherein said upper portion includes a substantially flat periphery flange plane, said middle portion includes a first truncated-cone shaped frame having a first cone height, and said bottom portion includes a second truncated-cone shaped frame having a second cone height.

6. The dishwashing appliance of claim 5, wherein said first cone height is smaller than said second cone height.

7. The dishwashing appliance of claim 6, wherein each of said upper portion, said middle portion, and said bottom portion of said filter frame respectively receives a first filter screen with a first filtering permeability, a second filter screen with a second filtering permeability, and a third filter screen with a third filtering permeability.

8. The dishwashing appliance of claim 7, wherein said first filtering permeability is greater than said second filtering permeability, and said second filtering permeability is greater than said third filtering permeability.

9. The dishwashing appliance of claim 1, wherein said filter frame integrally includes a plurality of layers of filter screens overlapping each other thereon.

10. The dishwashing appliance of claim 9, wherein said plurality of layers of filter screens are integrally coupled to said filter frame in a manner that an outermost layer has a greater filtering permeability than that of an innermost layer.

11. The dishwashing appliance of claim 1, wherein said debris collection chamber is a trough extending around an outer perimeter of said recirculation intake port.

12. The dishwashing appliance of claim 11, wherein said sump housing includes a check valve positioned on said outer perimeter of said recirculation intake port forming said debris collection chamber to allow said dishwashing fluid and said food debris accumulated in said recirculation intake port to flow to said drainage pipe port when said drainage pump is running.

13. The dishwashing appliance of claim 1, wherein said filter frame includes one or more flow paths in fluid communication with said spray system and said recirculation pump.

14. The dishwashing appliance of claim 13, wherein said lid includes an opening for at least a portion of said one or more flow paths within said filter frame in fluid communication with said spray system.

15. The dishwashing appliance of claim 1, wherein said lid includes one or more flow paths in fluid communication with said spray system and said recirculation pump.

16. The dishwashing appliance of claim 1, wherein said lid includes one or more air vents for venting of said filtration chamber during dishwashing operation.

17. The dishwashing appliance of claim 1, further comprising a rotatable self-cleaning device positioned within said filtration chamber of said filter frame.

18. The dishwashing appliance of claim 17, wherein said rotatable self-cleaning device includes a mechanical scraper that physically contacts at least a portion of said one or more filter screens attached on said filter frame to remove said food debris thereon into said debris collection chamber.

19. The dishwashing appliance of claim 18, wherein said mechanical scraper includes at least one of a single blade, multiple blades, and a brush.

20. The dishwashing appliance of claim 17, wherein said rotatable self-cleaning device includes an interior flow path in fluid communication with a washing fluid inlet and a plurality of nozzles to spray washing fluid supplied from said washing fluid inlet across said one or more filter screens attached on said filter frame to remove said food debris thereon into said debris collection chamber.

21. The dishwashing appliance of claim 20, wherein said rotatable self-cleaning device is rotated by a rotational force by virtue of said washing fluid flowing through said plurality of nozzles.

22. The dishwashing appliance of claim 17, wherein said rotatable self-cleaning device includes an impeller positioned at an end of said rotatable self-cleaning device closer to said recirculation intake port, wherein said rotatable self-cleaning device is rotated by said dishwashing fluid moving said impeller when said recirculation pump is running.

23. The dishwashing appliance of claim 17, wherein said rotatable self-cleaning device is rotated by a motor.

24. The dishwashing appliance of claim 1, wherein said lid is solid and impermeable.

25. A dishwashing appliance comprising:
- a tub defining a dishwashing chamber having a tub floor therein;
- a spray system having one or more distribution devices within said dishwashing chamber;

a recirculation pump operable to flow dishwashing fluid to said spray system; and a filtration assembly in fluid communication with said spray system and said recirculation pump for filtration of said dishwashing fluid that has circulated through said dishwashing chamber, said filtration assembly positioned at bottom of said dishwashing chamber through a recess formed by said tub floor thereof, said filtration assembly further comprising:

- a lid positioned at top of said filtration assembly and above said recess of said tub floor to form a gap therebetween around a periphery of said lid to allow said dishwashing fluid to flow into said filtration assembly;
- a filter frame coupled to said lid defining a filtration chamber, said filter frame configured for attaching one or more filter screens thereon through which said dishwashing fluid flows into said filtration chamber for filtration; and
- a sump housing having an open top portion through which said filter frame is disposed, and a base portion in fluid communication with said filtration chamber via a recirculation intake port and in fluid communication with said recirculation pump via a recirculation pump inlet port.

* * * * *